W. T. & L. H. Rand,
Hanging Saws.
N° 51,478. Patented Dec. 12, 1865.
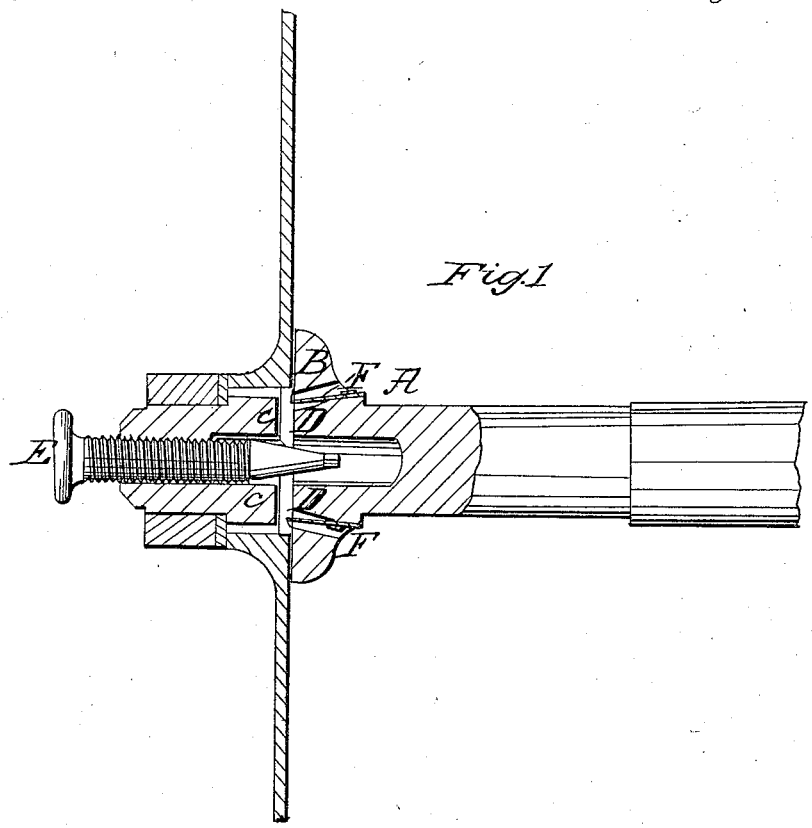
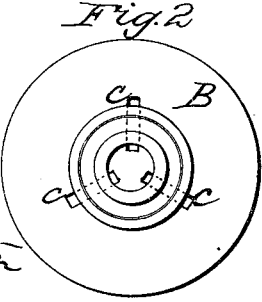

UNITED STATES PATENT OFFICE.

W. T. RAND AND L. H. RAND, OF MANCHESTER, NEW HAMPSHIRE.

IMPROVEMENT IN CENTERING CIRCULAR SAWS.

Specification forming part of Letters Patent No. 51,478, dated December 12, 1865.

*To all whom it may concern:*

Be it known that we, W. T. RAND and L. H. RAND, of Manchester, in the county of Hillsborough and State of New Hampshire, have invented a new and useful Improvement in Saw-Arbors; and we do hereby declare that the following is a full, clear, and exact description thereof, which will enable others skilled in the art to make and use the same, reference being had to the accompanying drawings, forming part of this specification, in which—

Figure 1 is a sectional view of an arbor for circular saws made according to our invention. Fig. 2 is an end view, the screw being removed from the arbor.

This invention consists in means for centering saws upon arbors which are too small in diameter for the saws to be mounted thereon; and it consists in placing inside of or sinking in recesses in the arbor a series of three or more dogs placed in radial directions, and which are moved outward against the inner circumference of the hub or central opening of the saw, by means of the tapering end of the screw, which is passed into the end of the arbor.

A designates a saw-arbor, and B the fixed collar, against which a saw is placed and against which it is clamped by a washer or collar and nut, or by any other suitable appliances.

When the central opening of a saw is larger than is necessary to enable it to fit on the arbor, it becomes necessary either to enlarge the dimensions of the arbor by adding a collar or sleeve, or else a new arbor of larger diameter must be substituted. Since such provisions are difficult to be made and expensive, it is often attempted to remedy the difficulty by wedging the saw upon the arbor, and in so doing it is a very nice and difficult operation to bring the opening in the saw concentric with the circumference of the arbor. Our invention obviates and removes such difficulty.

C C C are three dogs arranged radially in the body of the arbor, which is moreover made hollow. These dogs move in radial slots D, and are held down beneath the periphery of the arbor by springs F, one for each, which have their places in longitudinal openings made through the base of the collar B.

E is a screw which works in a screw-thread cut in the hollow sides at the end of the arbor, and its end is pointed or conical. The dogs C are of such a length and their inner ends of such a form as to allow the pointed end of the screw to enter between them when they are in their lowest position.

When a saw with a central opening larger than the arbor is to be fixed thereon, the screw is turned and driven inward, when its conical end will gradually and equally force the dogs C outwardly, bringing their heads against the edge of the opening of the saw and centering it with ease and exactness.

Any number of dogs or pins C may be used; but whatever their number they must be placed at equal distances apart, and must move in radial directions from the axis or center of the arbor.

We claim as new and desire to secure by Letters Patent—

In centering circular saws, the combination of radial pins suspended in slots cut in their arbors with a taper-pointed screw, or its equivalent, in the end of the arbor, substantially as shown.

W. T. RAND.
L. H. RAND.

Witnesses:
B. F. HAMM,
JAMES K. STEVENS.